United States Patent [19]

Wentzell et al.

[11] 4,452,753

[45] Jun. 5, 1984

[54] APPARATUS FOR CLEANING AND INSPECTING CLOSURE STUDS OF A NUCLEAR REACTOR VESSEL

[75] Inventors: Timothy H. Wentzell, South Windsor; Lawrence J. Edwards, Suffield, both of Conn.

[73] Assignee: Combustion Engineering, Inc., Windsor, Conn.

[21] Appl. No.: 352,908

[22] Filed: Feb. 26, 1982

[51] Int. Cl.³ .............................................. G21C 17/00
[52] U.S. Cl. ...................................... 376/249; 376/260
[58] Field of Search ................ 376/245, 249, 463, 260

[56] References Cited

U.S. PATENT DOCUMENTS

| | | | |
|---|---|---|---|
| 3,817,348 | 6/1974 | Jones | 376/249 |
| 3,830,536 | 8/1974 | Frisch et al. | 376/463 |
| 3,837,694 | 9/1974 | Frisch et al. | 376/463 |
| 3,851,906 | 12/1974 | Frisch et al. | 376/463 |
| 4,145,251 | 3/1979 | Qurnell | 376/245 |
| 4,158,600 | 6/1979 | Akimoto et al. | 376/260 |
| 4,223,575 | 9/1980 | Krueger | 376/260 |

*Primary Examiner*—Sal Cangialosi
*Attorney, Agent, or Firm*—Arthur L. Wade

[57] ABSTRACT

A support framework has casters which enable it to be moved into position for receiving the studs of nuclear reactor vessels so the studs may be cleaned and inspected. A housing on the framework isolates the stud while it is cleaned to control the radioactive debris removed from the stud surfaces. Brushes for the internal bore and external surface of the stud are mounted for simultaneously moving over the stud surfaces. Eddy current and ultrasonic inspection devices are substituted for the brushes and the internal and external surfaces simultaneously inspected while an encoder connected to both the inspection devices and stud manifest the location of any detected flaws.

6 Claims, 2 Drawing Figures

APPARATUS FOR CLEANING AND INSPECTING CLOSURE STUDS OF A NUCLEAR REACTOR VESSEL

TECHNICAL FIELD

The present invention relates to the mechanical cleaning and non-destructive, internal and external inspection of hollow and cylindrical studs during periodic shutdowns of their nuclear reactor vessel. More particularly, the invention encompasses the structure and its manipulation necessary to mechanically brush-clean and inspect the surfaces of threaded studs joining the upper portion of a nuclear reactor vessel to the cover of the vessel.

BACKGROUND ART

One of the myriad details required to inspect the critical structures of a nuclear reactor station calls for the internal and external surface cleaning and subsequent inspection of these surfaces of the massive studs mounted in the edge of the wall of the upper opening of the reactor vessel. Dull and prosaic as the task appears, the Gargantuan studs, threaded into their holes at the upper lip of the nuclear reactor vessel, must be unthreaded and subjected to cleaning and inspection. The inspections are a requirement of the ASME Code Section XI and cleaning is necessary prior to this inspection being performed.

It is interesting to recall that in the original installation of these studs, they are literally stretched by massive hydraulic lifting mechanisms attached to the upper ends, while thir nuts are threaded into place and bear upon the cover of the nuclear reactor vessel. A suitable configuration is formed on the upper end of each stud with which the hydraulic stretching mechanism is attached to the stud to exert its upward force. It is the threads for engaging the nut and the threads for engaging the vessel, and the shaft region between these threads, which are the primary targets for cleaning and inspection of the outside surface of the body of the stud. Additionally, there is a bore extending axially up into the stud which it is also important to clean and inspect. When it is considered that each stud has an imposing weight in the order of 1,000 pounds, and length in the order of 6 feet, reality strikes that the cleaner and inspector has an impressive responsibility.

There is need for a support framework on which each stud can be supported to automate large sections of the cleaning and inspection operations. There is a need to automate a reasonable amount of the cleaning and inspection to shorten the time and elevate the quality of these operations, and reduce associated radiation exposure to inspection personnel. With the fact that the debris cleaned from the stud may well have a significant level of radiation contamination, a system for collecting and isolating the material cleaned from the stud must be provided. All of the foregoing bases must be touched competently in order to produce a stud suitable for reinstallation in the nuclear reactor vessel for incorporation in the structure which maintains the vessel closure safely installed on the reactor vessel.

DISCLOSURE OF THE INVENTION

The present invention contemplates a movable support framework for receiving a stud for a nuclear reactor vessel upon which the external and internal surfaces of the stud are mechanically cleaned and subsequently inspected. The framework mounts a lead screw extended parallel to the stud axis, which has a carriage structure which, in turn, supports cleaning brushes simultaneously applied to the internal and external surfaces of the stud. The lead screw carriage is also adapted to support inspection scanners simultaneously translated the length of the internal and external stud surfaces inspected, and an arrangement for rotating the stud as the brushes and scanners are longitudinally translated the stud length. A vacuum system is provided to capture the debris cleaned from the stud surface and an encoder is provided to coordinate the stud and scanner positions in order to provide a record of the location of detected flaws.

Other objects, advantages, and features of this invention will become apparent to one skilled in the art upon consideration of the written specification, appended claims, and attached drawings.

BEST MODE FOR CARRYING OUT THE INVENTION

General Orientation

Figure 1:
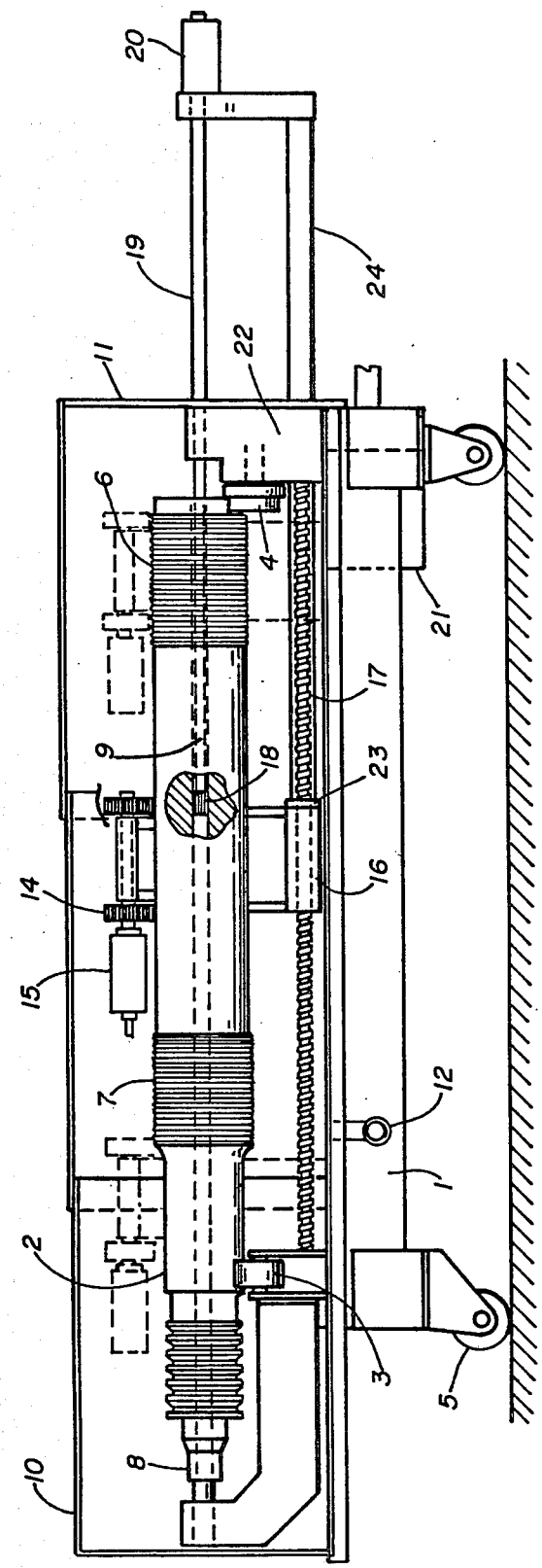
FIG. 1 is a sectioned elevation of a support framework on which studs are cleaned and inspected in which the present invention is embodied.

Orientation begins with the support framework 1 on which the stud 2 is nesting, or mounted, while being cleaned and inspected. Like designations appear on FIGS. 1 and 2. Both figures should be referred to alternatively in locating the structure designated. In its initial appearance in the disclosure, stud 2 is shown as removed from the nuclear reactor vessel and laid horizontally on the rollers which are, effectively, the bed of the support framework 1. Specifically, a pair of idler rollers are located at 3, supporting the front, or upper, end of the horizontal stud 2. A second pair of rollers 4 are also mounted on the support framework 1 and support the rear, or lower, end of the stud. Rollers 4 are powered to rotate the stud 2 by frictional engagement with the stud bearing down upon them. The support framework is mounted on casters 5 at the ends of its legs to facilitate positioning the framework to receive the stud to be cleaned and inspected.

The stud 2 is threaded on its bottom end at 6 whereby it is mounted in its bore on the rim of the nuclear reactor vessel. The front end of the stud is threaded at 7 in order to receive a nut to capture the cover of the nuclear reactor vessel between the lower surface of the nut and the upper edge of the vessel. Incidentally, structure 8 is formed on the extreme front end of the stud 2 with which to enable hydraulic tensioning means to exert upward force on the stud and stretch the stud as its nut is threaded into capture of the nuclear vessel cover. In summation, the initial view of the stud discloses it arranged horizontally within the support framework 1, ready for the cleaning of its internal and external surfaces and their subsequent inspection for flaws.

The more important portions of the external surface of the stud body to be cleaned are the threaded portions 6 and 7, and the shaft region between the threaded portions. The stud has an axial bore 9 whose surface will be described as internal the stud body. The embodiment of the invention will be described as it first simultaneously contacts these external and internal surfaces with cleaning tools. Second, much of the same structure will be utilized to bring inspection tools to these surfaces to detect flaws. Additionally, provision is made to control the radioactive waste cleaned from the stud surfaces and move such debris to a safe depository. Of course, any flaw detected will be recorded by an encoder geared to the inspection tools and the stud surfaces inspected. With this arrangement, a record is made of flaw location for remedial action.

The Cleaning Operation

In control of the presumably radioactive debris brushed from the surfaces of the stud 2, a cover 10 is provided on the support framework 1, enclosing the stud and the cleaning equipment. Cover 10 is formed in three telescoping sections. These sections are extended in FIG. 1 to come into sealing contact with wall 11. The enclosure provided by cover 10 and end wall 11 is subjected to a vacuum apparatus, not shown, but connected to aperture 12. When the vacuum apparatus is actuated, the presumably radioactive debris removed from the surface of stud 2 is drawn through aperture 12 and deposited in some predetermined safe disposal location.

Figure 2:
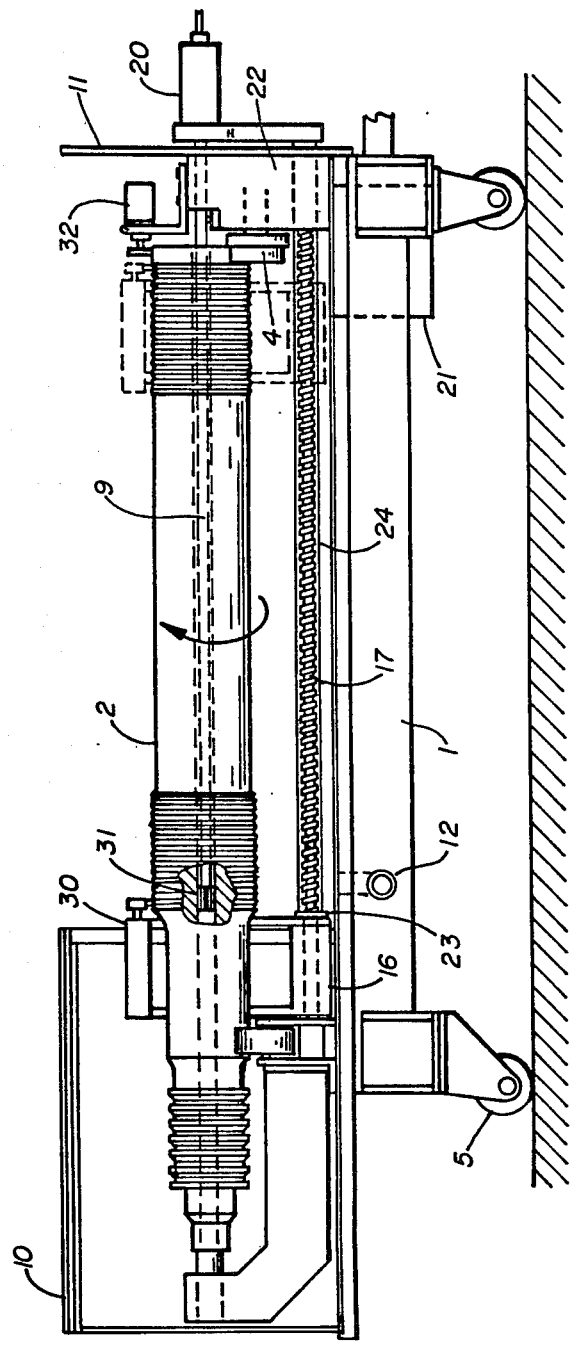
FIG. 2 is the structure of FIG. 1 with the isolation cover retracted and inspection devices positioned to detect flaws.

FIG. 2 shows the sections of cover 10 retracted from wall 11. In FIG. 1, while cover 10 is extended into engagement with wall 11, the cleaning brushes are disclosed in position. In FIG. 2, with cover 10 retracted from wall 11, the brushes are removed and replaced by flaw-sensing apparatus which entail both ultrasonic and eddy current techniques. There is novelty in the use of eddy current for a surface examination due to recent official recognition by the ASME of eddy current as a surface examining technique. The eddy current technique is used to examine for surface flaws in threads and on the smooth portion of the stud. The inclusion of a calibration standard into the apparatus is a considered part of this disclosure. There is additional novelty in the design of the fixtures used to move the eddy current probes accurately over the surfaces to be examined.

The ultrasonic transducer is used to perform a volumetric examination of the stud. There is novelty in the design of the transducer fixtures and the design of the qualification standards to assure complete examinations. The inclusion of a calibration standard into the apparatus is a considered part of this disclosure.

In FIG. 1, the brush structure 14, actuated by air motor 15 and cleaning the external surface of stud 2, is directly mounted on carriage 16. Carriage 16 is driven longitudinally parallel to the axis of stud 2 by connection with rotating lead screw 17. As screw 17 is reversibly rotated, it drives carriage 16 along a path parallel to the axis of stud 2 to clean the external surface of the stud. Simultaneously with the cleaning of the external surface of stud 2, the surface of bore 9 is cleaned by contact with brush structure 18. Brush structure 18 is mounted on the end of rod 19 which is plunged down bore 9 at the same time external brush structure 14 is cleaning the external surface of stud 2. Air motor 20 is connected to rod 19 to actuate the brush structure as the rod 19 reciprocates in the stud bore 9. Thus, as external brush structure 14 and bore brush structure 18 are simultaneously carried over their respective surfaces, the brushes are rotated by their respective motors to perform their cleaning function. Both brush structures are reciprocated by the same motor through their connection with lead screw 17. Motor 21 is connected to stud-rotating rollers 4. At the same time, motor 21 is connected to reversibly rotate lead screw 17. Gear train 22 is indicated as the connection between motor 21, rollers 4, and lead screw 17. Therefore, with mechanical connections between lead screw 17 and both brushes, the rotation of lead screw 17 by motor 21, through gear train 22, will reciprocate both brushes over their respective surfaces.

Carriage 16 is the connection between lead screw 17 and brush structure 18. Follower nut 23 is mounted on lead screw 17 and is connected to rod 19 through linkage characterized as follower 24. The result of these connections is that motor 21 rotates stud 2 and is linked to move the cleaning brush structures over the external and internal surfaces of the stud.

The Inspection Operation

Follower 24 and rod 19 both extend through end wall 11. Their connection is made outside of the volume defined by cover 10 and wall 11; therefore, as follower 24 and rod 19 extend through wall 11, sliding seal structure is maintained between these structures and their apertures in wall 11. Once the cleaning functions of the brushes is completed, they are simply replaced by flaw detecting structure. The flaw detecting structure is carried over the rotating surface of stud 2. Motors 20 and 15 are not actuated during the inspection sequence.

FIG. 2 discloses the three-piece cover 10 retracted from wall 11. With the cleaned stud 2 exposed, the inspection tools replace the brush structures 14 and 18. Specifically, an eddy current sensor 30 is mounted directly on carriage 16 to replace brush structure 14, and an ultrasonic transducer 31 replaces brush structure 18 on rod 19. An encoder 32 is mounted at the front end of the support framework to be actuated by both the stud 2 and inspection tool carriages in order to have any flaw detected manifested in spatial relationship to the stud 2.

Conclusion

Supporting framework 1 focuses attention on the invention embodied in both the cleaning and inspection structures. The cleaning of both the external surface and internal surface is carried out simultaneously. The flaw detection of both the external surface and the internal surface is carried out simultaneously. During the cleaning operation the radioactive debris is controlled until disposed of. Finally, an encoder is employed to give positive manifestation of any flaw that may appear during the inspection. The structures for embodying the various elements of the invention are novel.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A combined cleaning and inspection apparatus for nuclear reactor vessel closure studs, including,
   a support framework, a plurality of rollers extending horizontally in the support framework to form a bed, a nuclear reactor vessel closure stud placed on the roller bed of the support framework, a lead screw mounted on the support framework and extended parallel substantially the axis of the stud, a motor connected to the rollers and the lead screw for simultaneous rotation of the stud and lead screw, cleaning brushes connected to the lead screw for driving the brushes the length of the stud while in cleaning contact with the external and internal surfaces of the stud, a housing mounted on the support framework over the stud and the brushes to maintain in isolation the debris cleaned from the stud surfaces, an exit from the housing adapted to be attached to a vacuum means for removing the debris from the housing to a predetermined disposal location, and eddy current and ultrasonic inspection apparatus adapted to replace the brushes and be advanced by the lead screw to simultaneously inspect the external and internal surfaces of the stud.

2. A cleaning and inspection system for nuclear reactor vessel closure studs, including, a support framework, parallel rollers mounted on the support framework as a bed, a motor mounted on the framework and connected to drive the rollers, a nuclear reactor vessel closure stud positioned on the rollers so as to be axially rotated when the rollers are driven by their motor, a lead screw mounted on the framework and parallel to the axis of the stud, a connection between the lead screw and the motor to simultaneously rotate the lead screw and the stud, a carriage mounted on the lead screw so as to be reciprocated along the length of the stud as the lead screw is rotated, brushes connected to be actuated by air motors and connected to the lead screw and carriage while in simultaneous contact with the external and internal surfaces of the stud so as to clean the surfaces in preparation for inspection of the surfaces for flaws, a housing mounted on the framework extended over the stud and cleaning brushes to contain the debris removed from the surfaces of the stud, an aperture connected to the interior of the housing and arranged to be connected to a vacuum system to remove the debris to a predetermined location, flaw detectors adapted to replace the cleaning brushes and extending into inspection relationship with the surfaces of the stud, and an encoder connected to the inspection structure and stud to manifest the location of detected flaws.

3. A cleaning and flaw-detecting system for nuclear reactor vessel closure studs, including, a nuclear reactor vessel closure stud removed from service and requiring cleaning and inspection for flaws, a support framework sufficiently sturdy to receive the stud in a horizontal position, a bed within the framework characterized by load-bearing rollers extended parallel to each other within the framework in support of the stud as preparation for cleaning and inspection, a lead screw mounted on the framework and extending parallel the stud axis and substantially the length of the stud axis, a motor mounted on the framework and connected to simultaneously reversibly rotate the lead screw and the stud rollers, a carriage threadably engaged with the lead screw so as to be carried parallel the axis of the stud, cleaning brushes adapted to engage the surfaces of the stud and actuated by the lead screw to carry the brushes over the surfaces of the stud, an enclosure mounted on the framework and about the stud and cleaning brushes in control of the debris brushed from the surfaces of the stud, means on the enclosure adapted to be connected to a source of vacuum to remove the debris brushed from the surfaces of the stud, and means adapted to inspect the surfaces of the stud for flaws subsequent to cleaning by the brushes and arranged to replace the brushes.

4. The system of claim 3, in which, the cover is sectioned and arranged for manual removal subsequent to brush cleaning of the stud surfaces and prior to replacement of the brushes with the inspection means.

5. The system of claim 4 wherein the inspection means comprises, a first section including an eddy current sensor mounted on the carriage and extended into inspecting relationship to the external surface of the stud, and the second section of the inspection means includes an ultrasonic transducer arranged to traverse the surface of the stud bore.

6. The system of claim 5, including, encoder means connected to the stud and inspection means to manifest the location of any flaws detected in the stud.

* * * * *